US010827752B2

(12) United States Patent
Finan

(10) Patent No.: US 10,827,752 B2
(45) Date of Patent: Nov. 10, 2020

(54) DISINFECTANT COMPOSITION

(76) Inventor: Peter Finan, Huddersfield (GB)

(*) Notice: Subject to any disclaimer, the term of this patent is extended or adjusted under 35 U.S.C. 154(b) by 306 days.

(21) Appl. No.: 13/805,981

(22) PCT Filed: Jun. 17, 2011

(86) PCT No.: PCT/GB2011/000910
§ 371 (c)(1),
(2), (4) Date: Mar. 25, 2013

(87) PCT Pub. No.: WO2011/161396
PCT Pub. Date: Dec. 29, 2011

(65) Prior Publication Data
US 2013/0171264 A1 Jul. 4, 2013

(30) Foreign Application Priority Data

Jun. 21, 2010 (GB) .................................. 1010374.5

(51) Int. Cl.
| A01N 37/20 | (2006.01) |
| A01N 25/12 | (2006.01) |
| A01N 37/16 | (2006.01) |
| A01N 25/34 | (2006.01) |
| A01N 37/02 | (2006.01) |
| A01N 37/18 | (2006.01) |
| A01N 59/14 | (2006.01) |

(52) U.S. Cl.
CPC ............. *A01N 37/20* (2013.01); *A01N 25/12* (2013.01); *A01N 25/34* (2013.01); *A01N 37/02* (2013.01); *A01N 37/16* (2013.01); *A01N 37/18* (2013.01); *A01N 59/14* (2013.01)

(58) Field of Classification Search
CPC ........ A01N 25/12; A01N 37/16; A01N 25/34; A01N 37/02; A01N 37/20; A01N 37/18; A01N 25/22; A01N 59/14; A01N 59/00
See application file for complete search history.

(56) References Cited

U.S. PATENT DOCUMENTS

| 5,035,859 | A | * | 7/1991 | Gu et al. .......................... 422/28 |
| 6,034,081 | A | * | 3/2000 | Whittemore ........... A01N 43/50 |
| | | | | 514/210.01 |
| 6,149,821 | A | * | 11/2000 | Rounds et al. ............... 210/754 |
| 6,727,216 | B1 | | 4/2004 | Waeschenbach |
| 6,806,244 | B1 | | 10/2004 | Waschenbach |
| 7,291,276 | B1 | | 11/2007 | Zahn |
| 2004/0219297 | A1 | | 11/2004 | Raehse |
| 2005/0153854 | A1 | | 7/2005 | Meyer |
| 2010/0075883 | A1 | | 3/2010 | Laurence |

FOREIGN PATENT DOCUMENTS

| WO | WO90/06355 | * | 6/1990 | ............... C11D 7/06 |
| WO | WO01/36290 | * | 5/2001 | ............. B65D 65/46 |
| WO | WO01/37659 | * | 5/2001 | ............. A01N 25/00 |
| WO | WO 03/028429 A2 | | 4/2003 | |
| WO | WO 07/051957 A1 | | 5/2007 | |
| WO | WO2007/080187 | * | 7/2007 | ............... C11D 3/39 |

OTHER PUBLICATIONS

Gillis, Anna, "Peroxygens Enter U.S. Detergents," J. of the Amer. Oil Chemists, v. 66, No. 6, Jun. 1989.

* cited by examiner

Primary Examiner — Bethany P Barham
(74) Attorney, Agent, or Firm — Biopatent; Gary Baker

(57) ABSTRACT

This invention relates to disinfectant compositions comprising a first active ingredient comprising a source of acetyl radicals, and a second active ingredient comprising a source of peroxygen, the composition being soluble in water to provide a solution of peracetic acid.

15 Claims, No Drawings

DISINFECTANT COMPOSITION

CROSS-REFERENCE TO RELATED APPLICATIONS

This application is a U.S. National Phase of International Patent Application No. PCT/GB2011/000910 filed Jun. 17, 2011 which claims priority to United Kingdom application no. 1010374.5 filed 21 Jun. 2010, the disclosures of which are incorporated herein by reference in their entirety for all purposes.

This invention relates to disinfectant compositions. More particularly, but not exclusively, this invention relates to disinfectant systems.

Chlorine release tablets are the standard disinfection method in the health care industry. However, the chlorine release method has the disadvantage that chlorine is corrosive to several metals and alloys encountered in the health care sector, and the effectiveness of chlorine disinfectants against *clostridium difficile* is weakened when organic matter is present.

According to one aspect of this invention, there is provided a disinfectant composition comprising a first active ingredient comprising a source of acetyl radicals, and a second active ingredient comprising a source of peroxygen, the composition being soluble in water to provide a solution of peracetic acid.

The disinfectant composition may be provided in tablet form. Alternatively, the disinfectant composition may be held in a container, such as a sachet or a pouch. The container may be formed of a water soluble material, such as polyvinyl alcohol.

The disinfectant composition may further include a third active ingredient comprising a pH modifier.

The first active ingredient may comprise tetra-acetyl ethylenediamine (TAED). A suitable supplier of TAED is Warwick International Group Limited. The TAED may be an uncoated TAED, for example a uncoated powdered form of TAED. A suitable TAED is Mykon$^R$ B675 TAED.

The first active ingredient may be present in the disinfectant composition in an amount in the range of 1 wt % to 50 wt %. The first active ingredient may be present in the disinfectant composition in an amount in the range of 20 wt % to 40 wt %. The first active ingredient may be present in the disinfectant composition in an amount in the range of 20 wt % to 30 wt %, for example 22 wt % to 24 wt %. The first active ingredient may be present in the disinfectant composition in an amount of 23.4 wt %.

The second active ingredient may comprise a source of peroxygen, hereinafter a peroxygen, such as sodium, potassium or ammonium percarbonate; sodium, potassium or ammonium perborate; sodium, potassium or ammonium persulphate; sodium, potassium or ammonium perphosphate; carbamide peroxide. In one embodiment, the peroxygen compound may be sodium percarbonate. In a preferred embodiment, the peroxygen is sodium perborate, for example sodium perborate monohydrate.

The second active ingredient may be present in the disinfectant composition in an amount in the range of 1 wt % to 100 wt %. The second active ingredient may be present in the disinfectant composition in an amount in the range of 1 wt % to 90 wt %. The second active ingredient may be present in the disinfectant composition in an amount in the range of 40 wt % to 60 wt %. The second active ingredient may be present in the disinfectant composition in an amount of the range of 40 wt % to 50 wt %, for example 44 wt % to 46 wt %. The second active ingredient may be present in the disinfectant composition in an amount of substantially 46.82 wt %.

The third active ingredient may comprise an anhydrous organic acid, which may be powdered or granular. The third active ingredient may be one or more selected from citric acid, fumaric acid, tartaric acid, adipic acid. In one embodiment, the third active ingredient may comprise anhydrous citric acid.

The third active ingredient may be present in the disinfectant composition in an amount in the range of 1 wt % to 50 wt %. The third active ingredient may be present in the disinfectant composition in an amount in the range of 20 wt % to 40 wt %. The third active ingredient may be present in the disinfectant composition in an amount in the range of 25% to 35 wt %, for example 25 wt % to 29 wt %. The third active ingredient may be present in the disinfectant composition in an amount in the range of 26.98 wt %.

The disinfectant composition may comprise a chelating agent. The chelating agent may comprise a phosphonate or ethylenediamine tetra acetic acid (EDTA), or a salt thereof, for example di-metal EDTA, such as disodium EDTA or dipotassium EDTA.

The chelating agent may be present in the disinfectant composition in an amount in the range of 0.01 wt % to 1 wt %. The chelating agent may be present in the disinfectant composition in an amount of 0.05 wt % to 0.15 wt %. The chelating agent may be present in the disinfectant composition in an amount in the range of 0.09 wt % to 0.11 wt %. The chelating agent may be present in the disinfectant composition in an amount of 0.1 wt %.

The chelating agent may reduce water hardening, and may stabilise the peracetic acid.

The disinfectant composition may comprise a surfactant. The surfactant may comprise an anionic surfactant. A suitable anionic surfactant may include Fatty Alcohol Sulphates, Fatty Alcohol Phosphates, fatty alcohol benzene sulphonates, soaps (sodium and potassium salts of fatty acids), fatty alcohol ether sulphates, olefin sulphonates, lignosulphonates, phosphate esters, or sarcosinates. In one embodiment, the anionic surfactant is sodium lauryl sulphate.

The surfactant may comprise a non-ionic surfactant for example two or more different non-ionic surfactants. A suitable non-ionic surfactant may include ethoxylated and propoxylated fatty alcohols, ethoxylated and propoxylated alkyl phenols, fatty acid esters, Polyethylene glycol esters, alkyl glucosides, glyceryl and polyglyceryl esters, ethoxylated/propoxylated copolymers, ethoxylated thiols, glucose and sucrose esters, sugar esters, sorbitan esters, ethoxylated glucose and sucrose esters, ethoxylated sugar esters, ethoxylated sorbitan esters, linear and branched fatty alcohol pyrrolidone derivatives (N-substituted). In one embodiment, the non-ionic surfactant comprises a fatty alcohol derivative for example a fatty alcohol glucoside, for example a C8-C12 fatty alcohol glucoside, such as a C10 fatty alcohol glucoside. A suitable C10 fatty alcohol glucoside is Glucopon$^R$ 215UP manufactured by Cognis.

In one embodiment, the non-ionic surfactant comprises an N-substituted pyrrolidone for example a C8-N-substituted pyrrolidone (or n-octyl pyrrolidone). A suitable C8-N-substituted pyrrolidone is caprylyl pyrrolidone (marketed under the trade name Surfadone$^R$ LP100). The surfactant(s) may be provided in an inert carrier for example Monopropylene Glycol. It is believed that the surfactant may wet the surfaces of the liquid in which the composition is dissolved by lowering the surface tension. This is particularly important when treating hydrophobic microorganisms such as certain types of spores.

In one embodiment, the surfactant comprises at least two different non-ionic surfactants for example a fatty alcohol glucoside and an n-octyl pyrrolidone. The surfactant may further comprise an anionic surfactant, for example sodium lauryl sulphate.

In the embodiments described herein, it is believed that the surfactant may wet the other ingredients to facilitate dissolving the other ingredients. The surfactant may also provide the disinfectant composition with degreasing properties.

The surfactant may be present in the disinfectant composition in an amount in the range of 0.01 wt % to 0.5 wt %. The surfactant may be present in the disinfectant composition in an amount in the range of 0.1 wt % to 0.3 wt %. The surfactant may be present in the disinfectant composition in amount of 0.15 wt % to 0.25 wt %. The surfactant may be present in the disinfectant composition in an amount of 0.2 wt %.

The disinfectant composition may further include a corrosion inhibitor. The corrosion inhibitor may comprise a triazole compound.

The corrosion inhibitor may be present in the disinfectant composition in an amount in the range of 0.01 wt % to 0.5 wt %. The corrosion inhibitor may be present in the disinfectant composition in an amount in the range of 0.1 wt % to 0.3 wt %. The corrosion inhibitor may be present in the disinfectant composition in an amount in the range of 0.15 wt % to 0.25 wt %. The corrosion inhibitor may be present in the disinfectant composition in an amount of 0.2 wt %.

A suitable corrosion inhibitor is sold by Brad-Tech Ltd under the trade mark BRADTECH 6030.

The disinfectant composition may be in the form of a tablet or a pouch. The pouch may be formed by arranging the composition within an envelope formed of a water soluble material, such as a water soluble plastics material. The envelope may comprise a pouch or a sachet.

According to another aspect of this invention, there is provided a disinfectant system comprising a disinfectant composition, and a water soluble container in which the disinfectant composition is held.

The disinfectant composition maybe a disinfectant composition as described in the third paragraph on page 1 and in the paragraphs thereafter.

The container may comprise a sachet or pouch, and may be formed of polyvinyl alcohol. The container may be formed of a water soluble thermoplastic film such as a polyvinyl alcohol based thermoplastic film. An example of a suitable water soluble thermoplastic film is a boron-stable thermoplastic film such as Monosol M8900 sold under the trade mark Monosol$^R$.

A further aspect of the invention provides a process for the preparation of a disinfectant composition according to the invention, the process comprising the steps of:
  i) Preparing a liquid composition of the non-ionic surfactant(s), optionally including an inert carrier, and the corrosion inhibitor;
  ii) Preparing a powder composition of the first active ingredient, second active ingredient, third active ingredient, anionic surfactant (e.g. sodium lauryl sulphate) and chelating agent;
  iii) Adding the liquid composition to the powder composition to provide a homogeneous blend.

In one embodiment, the powder composition is prepared by blending the components consecutively in the following order: first active ingredient, second active ingredient, third active ingredient, anionic surfactant (e.g. sodium lauryl sulphate) and chelating agent.

Embodiments of the invention will now be described by way of example only.

EXAMPLE 1

A disinfectant composition is formed by mixing the following ingredients in powder form:
  1) 23.40 wt % of a first active ingredient, in the form of tetra-acetyl ethylenediamine, to provide a source of acetyl radicals;
  2) 46.82 wt % of a second active ingredient, in the form of sodium perborate monohydrate, to provided a source of peroxygen, the first and second active ingredients being soluble in water to provide a solution of peracetic acid;
  3) 26.98 wt % of a third active ingredient, in the form of anhydrous citric acid to act as a pH modifier;
  4) 0.1 wt % of a chelating agent, in the form of dipotassium ethylenediamine acetate (EDTA). The chelating agent helps to reduce water hardness and to stabilise the peracetic acid;
  5) 0.2 wt % of a surfactant, in the form of sodium lauryl sulphate. The surfactant helps to wet the other ingredients, thereby facilitating dissolving the other ingredients in the aqueous solution;
  6) 0.2 wt % of a corrosion inhibitor, in the form of a triazole compound, which prevents against acid and oxidative corrosion.

EXAMPLE 2

A disinfectant (MTPI Powder blend PB15) composition is formed by mixing the following ingredients as described below:

Liquid Pre-Blend

| Ingredient | % w/w |
|---|---|
| Monopropylene Glycol | 40.0% |
| Glucopon 215UP | 40.0% |
| Surfadone LP100 | 12.0% |
| Bradtech 6030 | 8.0% |
| Total→ | 100.0% |

Powder Blend PB15

| Ingredient | % w/w | |
|---|---|---|
| Mykon B675 TAED | 23.40% | |
| Sodium Perborate Monohydrate | 46.82% | |
| Citric Acid Anhydrous | 26.98% | |
| Sodium Lauryl Sulphate Powder | 0.20% | |
| Dipotassium EDTA | 0.10% | |
| Liquid Pre-Blend | 2.50% | (of which 1.00% is Monopropylene glycol, 1.00% is Glucopon$^R$ 215IP, 0.30% is Surfadone$^R$ LP100 and 0.20% is Bradtech$^R$ 6030) |
| Total → | 100.0% | |

A—Pre-mix the liquid blend in the given order.
B—Ensure powder blender is scrupulously clean and dry.

C—Charge the powder blender with the powder ingredients in the following order:
1. Mykon B675 TAED—Allow ALL lumps to break up before adding next ingredient
2. Sodium Perborate Monohydrate
3. Citric Acid Anhydrous
4. Sodium Lauryl Sulphate Powder
5. Disodium EDTA Blend the above powders for 30 minutes.

Finally, add the Liquid Blend by spraying or slewing slowly over the powder blend through the addition hatch, or through the open blender with full extraction.

Blend for at least 10 minutes or until a homogenous and lump-free blend is achieved.

Ingredient Notes:
Glucopon 215UP—C8/C10 glucoside (Cognis)
Surfadone LP100—n-Octyl Pyrrolidone (I.S.P)
Bradtech 6030—blended proprietary corrosion inhibitor (Brad Tech)
Mykon B675 TAED—fine powdered Tetra Acetyl Ethylene Diamine (Warwick International)

The substances described in the examples above are rinsed and then 20 g (or other suitable amount such as 5 g or 10 g) doses are compressed into individual tablets. A 20 g tablet of the above described Example produces approximately 2500 ppm of peracetic acid radicals when dissolved in 1000 ml of water. It is known that approximately 2500 ppm of peracetic acid is sufficient to provide excellent sporicidal action.

In an alternative embodiment, a disinfectant system is provided, in which the disinfectant composition described above is provided in 20 g (or other suitable amount such as 5 g or 10 g) doses in individual sachets or pouches, which may be formed of a water soluble material. In this embodiment, the sachets or pouches are formed of polyvinyl alcohol.

The above described alternative embodiment provides the following advantages over prior art chlorine based disinfectants:

The user does not have to touch the disinfectant composition, thereby providing a health and safety benefit, as compared to chlorine tablets, which are handled by the user;

The sachets deliver a metered dose of ingredients every time, eliminating user inconsistencies, thereby providing an advantage of powdered formulations, which must be measured each time;

The sachets dissolve within seconds in warm water (35-40° C.), giving a disinfectant solution which gains maximum potency in a matter of minutes, and maintains that level of potency over an hour, whereas tablets take significantly more time to dissolve;

The solution of peracetic acid generated is active against all pathogens even under 'dirty' conditions with interfering grime, protein, human detritus etc, whereas chlorine based disinfectants lose efficacy in the presence of organic matter;

The solution is non-corrosive, through the addition of the above described corrosion inhibitor, whereas chlorine based disinfectants can corrode metals.

The disinfectant composition described above, in the form of a tablet, or provided in a pouch or sachet, can be dissolved in 1000 ml water (warm water 35-40° C.) to provide a disinfecting solution. The disinfecting solution can then be applied to a surface for disinfecting purposes.

There is thus described a disinfectant composition, in which the embodiments described herein have the advantage that it can destroy microbial contamination, including *Clostridium difficile*. There is no contact with the active ingredient by the users. When the disinfectant composition is provided as a disinfectant system in a pouch or sachet, the ingredients are not compacted and therefore dissolve quicker than other forms. This leads to quicker release of the active ingredients. Also, the provision of the disinfectant composition in sachet, pouch or tablet form provides ease of usage and ease of storage.

It is intended to provide sachets, pouches or tablets comprising 20 g of the disinfectant composition described above to provide 2500 ppm peracetic acid in 1000 ml water. It is known that 2500 ppm of peracetic acid provides excellent sporicidal results.

The invention claimed is:

1. A disinfectant composition comprising:
a first active ingredient comprising a source of acetyl radicals, and
a second active ingredient comprising a source of peroxygen,
the composition being soluble in water to provide a solution of peracetic acid,
wherein the composition comprises a non-ionic surfactant comprising an N-substituted pyrrolidone, and
wherein the composition includes a chelating agent other than a phosphonate; and,
wherein the disinfectant composition does not comprise a phosphonate.

2. A disinfectant composition comprising:
a first active ingredient comprising a source of acetyl radicals, and
a second active ingredient comprising a source of peroxygen,
the composition being soluble in water to provide a solution of peracetic acid,
wherein the composition comprises a non-ionic surfactant comprising an N-substituted pyrrolidone,
wherein the composition includes a chelating agent other than a phosphonate, and
wherein the composition is in tablet form or in a container, wherein the container is formed of a water soluble material.

3. A disinfectant composition according to claim 1, further comprising a third active ingredient comprising a pH modifier.

4. A disinfectant composition according to claim 1, wherein the first active ingredient comprises tetra-acetyl ethylenediamine (TAED) as uncoated TAED.

5. A disinfectant composition according to claim 1 wherein the first active ingredient is present in the disinfectant composition in an amount in the range of 20 wt% to 40 wt%.

6. A disinfectant composition according to claim 1, wherein the second active ingredient is selected from the group consisting of sodium, potassium or ammonium percarbonate; sodium, potassium or ammonium perborate; sodium, potassium or ammonium persulphate; sodium, potassium or ammonium perphosphate; and carbamide peroxide.

7. A disinfectant composition according to claim 1 wherein the second active ingredient is present in the disinfectant composition in an amount in the range of 40 wt% to 60 wt%.

8. A disinfectant composition according to claim 3 wherein the third active ingredient comprises an anhydrous organic acid.

9. A disinfectant composition according to claim 3, wherein the third active ingredient is present in the disinfectant composition in an amount in the range of 1 wt% to 50 wt%.

10. A disinfectant composition according to claim 1, wherein the chelating agent comprises ethylenediamine tetra acetic acid (EDTA) or a salt thereof.

11. A disinfectant composition according to claim 10 wherein the chelating agent is present in the disinfectant composition in an amount in the range of 0.01 wt% to 1 wt%.

12. A disinfectant composition according to claim 11 wherein the composition comprises an anionic surfactant which is selected from fatty alcohol sulphates, fatty alcohol phosphates, fatty alcohol benzene sulphonates, soaps (sodium and potassium salts of fatty acids), fatty alcohol ether sulphates, olefin sulphonates, lignosulphonates, phosphate esters and sarcosinates.

13. A disinfectant system comprising a disinfectant composition according to claim 1, and a water soluble container in which the disinfectant composition is held.

14. The disinfectant composition according to claim 2, wherein said water-soluble material is polyvinyl alcohol.

15. The disinfectant composition according to claim 8, wherein said anhydrous organic acid is selected from citric acid, fumaric acid, tartaric acid, adipic acid and a combination thereof.

* * * * *